US009037450B2

(12) United States Patent
Vukosavljevic et al.

(10) Patent No.: US 9,037,450 B2
(45) Date of Patent: May 19, 2015

(54) TEXT OVERLAY TECHNIQUES IN REALTIME TRANSLATION

(71) Applicant: Microsoft Corporation, Redmond, WA (US)

(72) Inventors: Magdalena Vukosavljevic, Bellevue, WA (US); Ruchita Bhargava, Redmond, WA (US); Matthew S. Ashman, Seattle, WA (US); Ivan Stojiljkovic, Belgrade (RS); Pavle Josipović, Belgrade (RS); Djordje Nijemcevic, Belgrade (RS); Milan Vugdelija, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 13/715,902

(22) Filed: Dec. 14, 2012

(65) Prior Publication Data

US 2014/0172408 A1 Jun. 19, 2014

(51) Int. Cl.
*G06F 17/21* (2006.01)
*G06F 17/28* (2006.01)
*G06K 9/00* (2006.01)

(52) U.S. Cl.
CPC ............ *G06F 17/211* (2013.01); *G06F 17/289* (2013.01); *G06K 9/00442* (2013.01)

(58) Field of Classification Search
CPC ........................................................ G06F 17/20
USPC ............................................... 704/2; 348/564
See application file for complete search history.

(56) References Cited

U.S. PATENT DOCUMENTS

| 6,024,571 | A  | * | 2/2000  | Renegar ......................... 434/157 |
| 6,473,523 | B1 | * | 10/2002 | Newman et al. ............... 382/176 |
| 8,086,440 | B2 | * | 12/2011 | Elliot et al. ........................ 704/2 |
| 8,645,120 | B2 | * | 2/2014  | Elliot et al. ........................ 704/2 |
| 8,704,948 | B2 | * | 4/2014  | Mountain ...................... 348/564 |
| 8,761,513 | B1 | * | 6/2014  | Rogowski et al. ............ 382/181 |
| 2003/0200505 | A1 |  | 10/2003 | Evans |
| 2009/0198486 | A1 |  | 8/2009  | Chang |
| 2012/0163668 | A1 |  | 6/2012  | Englund et al. |
| 2012/0245920 | A1 |  | 9/2012  | Wu |

OTHER PUBLICATIONS

Donald Strachan, "Travel Advice: The Best Translation Technology", retrieved at: <<http://www.telegraph.co.uk/travel/travel-advice/9074982/Travel-advice-the-best-translation-technology.html>>, Feb. 12, 2012, last accessed Oct. 8, 2012, 4 pages.

(Continued)

*Primary Examiner* — Susan McFadden
(74) *Attorney, Agent, or Firm* — Steven Spellman; Peter Taylor; Micky Minhas

(57) ABSTRACT

Architecture that employs techniques for overlaying (superimposing) translated text on top of (over) scanned text in realtime translation to provide clear visual correlation between original text and translated text. Algorithms are provided that overlay text in cases of translated scanned text of language written in first direction to a language written in same direction, translate scanned text from a first language written in a first direction to a second language written in the opposite direction, and translated scanned text from a language written in a first direction to language written in a different direction.

20 Claims, 9 Drawing Sheets

(56) References Cited

OTHER PUBLICATIONS

"Scan Translating Technology", retrieved at: <http://www.fujixerox.com/eng/company/technology/scan/>>, last accessed Oct. 8, 2012, 2 pages.

Paul Boutin, "A New Reality", Technology Review India, retrieved at: <<http://www.technologyreview.in/review/423736/a-new-reality/>>, May 2011, last accessed Oct. 8, 2012, 2 pages.

Vikram Dendi, "New Translator App for Windows Phone Powered by Bing Available for Free Download", The Bing Team, retrieved at: <<http://www.bing.com/community/site_blogs/b/search/archive/2012/04/16/new-translator-app-for-windows-phone-powered-by-bing-available-for-free-download.aspx>>, Apr. 16, 2012, last accessed Oct. 8, 2012, 2 pages.

Fragoso et al., "TranslatAR: A Mobile Augmented Reality Translator on the Nokia N900", Technical Report 2010-12, Jul. 2010, 7 pages.

"Word Lens", Quest Visual, retrieved at: <<http://www.questvisual.com/us/>>, last accessed Dec. 14, 2012, 2 pages.

* cited by examiner

TEXT OVERLAY TECHNIQUES IN REALTIME TRANSLATION

BACKGROUND

A large number of users currently live and work in diverse and highly mobile environments. For example, employees travel on the job more than ever, and businesses, local or otherwise, exist to serve customers of many different nationalities. Thus, a primary goal is to overcome barriers imposed by different languages spoken and in textual formats in order to have some modicum of success in business and in communications at many levels.

A principal device in use by users for many different purposes is the ubiquitous mobile phone. Such mobile devices are being built with ever-increasing hardware and software capabilities, thereby enabling the more sophisticated utilization of device capabilities such as the camera which when employed can assist users in making decisions and completing tasks across disparate language barriers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs one or more techniques for overlaying (superimposing) translated text on top of (over) scanned text in realtime translation (in response to the image (or images) being captured and the associated text recognized) to provide clear visual correlation between original text and translated text. An algorithm overlays text in cases of translating text of language written in first direction to a language written in same direction. For example, when translating from German text (written left to right) to English text (written left to right), the English translation is overlayed (visually presented on top of) onto the German text. In general, the original text and translated text may differ in the number of words and the word order may also differ. The correspondence between the original text and the translated text is still intuitive and useful to the viewer on at least a line-by-line basis, and sometimes on a word-for-word basis; however, it is not the case that a word-for-word correlation can be observed in every instance.

In one robust implementation, the overlay of the translated text can be made word-for-word on the original text. Put another way, if the original text is three words, and the translation is three words, and each translated word corresponds to a single original text word, the visual presentation is that the first word of the translated text overlays the corresponding first word of the original text, the second word of the translated text overlays the corresponding second word of the original text, and so on. Thus, there can be made a direct correlation between a word or words of the translated text to the equivalent word or words of original text (e.g., words, phrases, etc.) of the different languages.

Another aspect of the architecture is an algorithm that translates text from a first language written in a first direction to a second language written in the opposite direction. For example, scanned Arabic text (written right-to-left) is processed and translated to English (written left-to-right).

The architecture also includes an algorithm for translating text from a language written in a first direction to language written in a different direction (e.g. orthogonal). For example, scanned Japanese text (written vertically top-to-bottom and right-to-left) is processed and translated to English (written horizontally and left-to-right).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
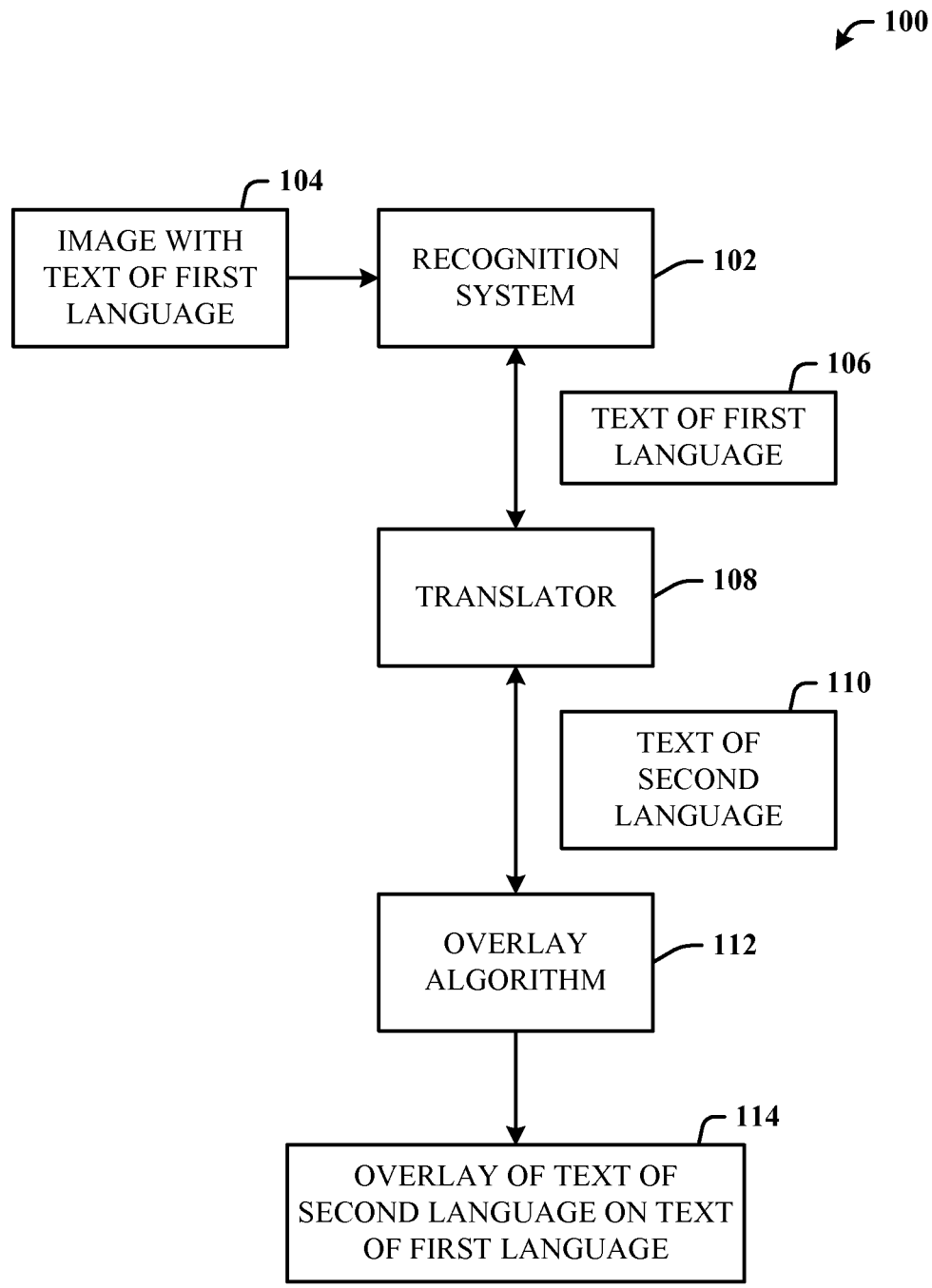
FIG. 1 illustrates a system in accordance with the disclosed architecture.

The disclosed architecture employs techniques for overlaying (superimposing) translated text on top of (over) scanned text of an image (or stream of images, such as in video) in realtime translation to provide clear visual correlation (e.g., word-for-word, phrase-for-phrase, etc.) between original text and translated text. Algorithms are provided that overlay text in cases of translated scanned text of a language written in first direction to a language written in same direction, translate scanned text from a first language written in a first direction to a second language written in the opposite direction, and translate scanned text from a language written in a first direction to language written in a different direction.

Text scanning using a camera, in particular, enables text translation of languages where typing or other forms of input are difficult or impossible (e.g., currently, it is nearly impossible for a non-Chinese speaking person to translate a restaurant menu written in Chinese by using dictionary or translation application in which the text needs to be typed). In the case when the user is translating text (by scanning) from a language written in one direction to another language written in different direction (e.g., from Japanese, which can be written top-to-bottom, to English, which is written left-to-right), the optimum user experience places the translated text over (superimposed on top of) the original text (image). This helps the user understand the correlation between the two languages (and words of the languages), while at the same time making it easy for user to read the text in the natural way.

In these cases, optical character recognition (OCR) can help users understand printed language on street signs, train schedules, restaurant menus, posters, museums, etc., in local environments of diverse ethnic populations (and corresponding languages) and when traveling in foreign countries, for example. The architecture overlays translated text over (e.g., on top of) scanned text in realtime translation scenarios to provide clear correlation between original and translated text.

Client-side OCR technology provides a compelling user experience when translating text. Overlaying translated text onto scanned text in the right direction provides a way to assist users in understanding exactly how translated text corresponds to the text being scanned. For example, if the user is vegetarian and is ordering a meal in a restaurant, if the text is correctly overlayed, the user can readily understand exactly which line item in the menu does not contain meat.

The languages, original and translated, can be automatically determined via local applications installed to perform such functions. Alternatively, or in combination therewith, a user interface can be provided that enables the user to select either (or both) the original or (and) translated languages. Moreover, rather than performing all translation locally, the translation and/or one or more other processes can be performed in combination with a network service in communication with the client-side application(s). Thus, some portions of the translation, recognition, etc., can be performed by the network service, while other operations can be performed locally, to provide optimum performance and user experience.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a recognition system 102 that recognizes text in an image 104 (with text of a first language 106). The text of the first language 106 is written in a first direction. For example, if English, the text of the first language 106 is written horizontally left to right with additional lines of text underneath; if Chinese, the text is written vertically from top to bottom with additional wording to the left, and so on.

A translator 108 translates the text of the first language 106 into text of a second language 110. For example, the text of the first language 106 can be English (as OCR'd for the scanned image 104) and the text of the second language 110 can be Spanish. The translator 108 can be any suitable software/hardware translation component(s) capable of performing text-to-text translation of different languages. An overlay algorithm 112 determines orientation and alignment between the text of the first language 106 and the text of the second language 110, and overlays the text of the second language 110 on the text of the first language 106, as can be viewed in a display.

The recognition system 102, the translator 108, and the overlay algorithm 112 operate to overlay the text of the second language 110 on top of the text of the first language 106 in realtime for viewing using a video mode. Thus, all the user need do is to point the camera at the item (e.g., sign, menu, document, etc.) having the text and the video mode operation presents the overlayed text on the texts of the scanned image of the item.

The recognition system 102 calculates a first bounding box that circumscribes the text of the first language 106 to determine the size of the text of the first language 106 and a second bounding box that circumscribes the text of the second language 110 to determine the size of the text of the second language 110. The overlay algorithm 112 vertically aligns the second bounding box to the first bounding box as part of overlaying the text of the second language 110 on the text of the first language 106. The overlay algorithm 112 aligns the first and second bounding boxes to each other based on bounding box centers.

The overlay algorithm 112 computes a relationship of textual portions of the second language to related textual portions of the first language and overlays the related textual portions. The overlay algorithm 112 obtains orientation information associated with the text of the first language 106 in the image. The orientation information relates to writing text of a language vertically or horizontally. The overlay algorithm 112 overlays the text of the second language 110 on the text of the first language 106 in a direction opposite from which the first language is written or in a same direction as the first language is written. The overlay algorithm 112 overlays the text of the second language 110 on the text of the first language 106 in a direction orthogonal to the direction in which the first language is normally written and new lines are added.

The text of the first language 106 and/or the second language 110 can have graphical emphasis applied such as is related to font size and type, degrees of transparency (e.g., 50%), coloration, etc., that differentiate to the viewer the languages and which is on top (or underlying the other). This also includes graphical emphasis such as highlighting, italicization, and so on. This also includes the interpretation (determination) of a portion of translated text as a hyperlink, such that the hyperlink of a first language is translated into an active hyperlink of a second language, which the viewer may then select (interact with) to navigate to the associated destination (e.g., website, document, etc.).

The OCR engine (as part of the recognition system 102) takes as an input an image of the text and the language of the text in the image (which can be set by the user or algorithmically detected), and outputs recognized text with word/line bounding boxes. Since the language of the text in the scanned image is known, the algorithm for overlaying text obtains the (orientation) information of what are the possible direction(s) in which that text can be written. For example, English words are usually written from left to right, while new lines are added below the previous line. Japanese symbols, on the other hand, can be written top-to-bottom, while every new line is added to the left side of the previous line; or also from left to right, where every new line is added below the previous one.

Figure 2:
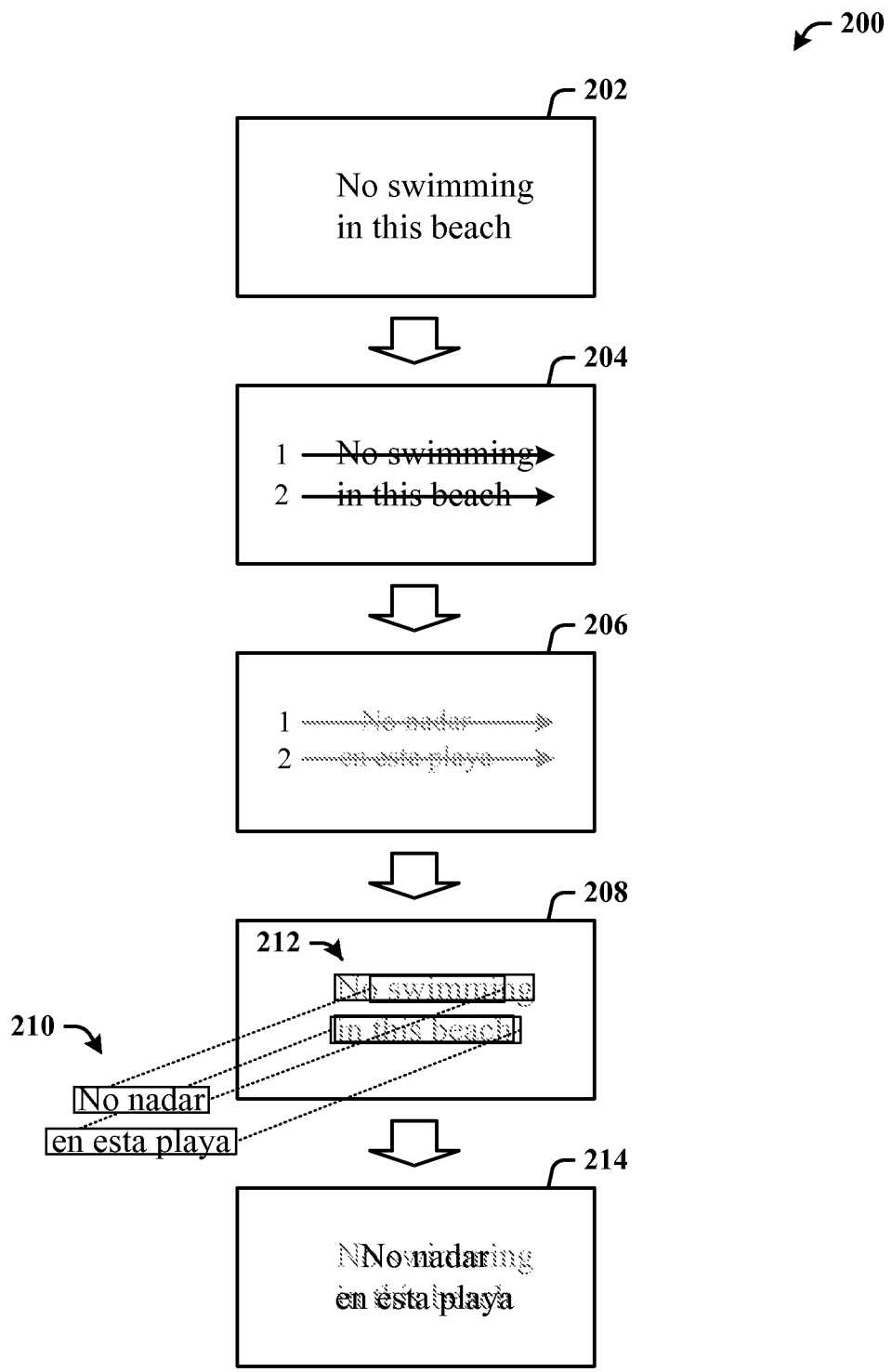
FIG. 2 illustrates an algorithm for overlaying text in cases of translating text from a first language written in first direction to a second language written in the same direction.

FIG. 2 illustrates an algorithm 200 for overlaying text in cases of translating text from a first language written in first direction to a second language written in the same direction. In this example, English is the scanned text from the image (written left to right) and translated to Spanish (also written left to right). In a first panel 202, the text recognized from the scanned image (also referred to as the "from" language text, or called the scanned text) is in the English language, "No swimming in this beach". In a second panel 204, the algorithm detects two lines of text and the arrows indicate the "from" text is written left to right and are in the center of the word string for that given line. In a third panel 206, translation (by the translator 108) is the English text into the Spanish equivalent (the "to" language text, or also called the translated text), "No nadar en esta playa", on two lines like the English version, and written left to right. Similarly, the algorithm detects two lines of text and the arrows indicate the text is written left to right and are in the center of the word string for that given line.

In a fourth panel 208, the bounding boxes are derived and applied to both the English text and the Spanish text. There are bounding boxes for the scanned textual portions of "No swimming" and "in this beach", as well as for the translated textual portions "No nadar" and "en esta playa". For clarity of this description, the translated text 210 is projected away from the scanned text 212. The bounding box of the translated text "No nadar" is overlayed onto the scanned text "No swimming", aligned and overlapped. Similarly, the bounding box of the translated text "en esta playa" is overlayed onto the scanned text "in this beach", aligned and overlapped.

When user scans the image text, the OCR engine outputs the recognized text and the line bounding boxes. Since the "from" and "to" languages are known at this point (e.g., both set by user), the directions in which the languages are written are known; thus, the appropriate algorithm can be used. In case the directions are the same, the height of the line bounding boxes of overlayed (translated) text is computed to be the same as for scanned text (height of line bounding boxes). The centers of the line bounding boxes for scanned and overlayed text are computed to overlap.

In a fifth panel 214, a visual effect is to fade the scanned text so that the translated text can be easily viewed and understood, as presented in a user device display. The translated text is presented horizontally in front of the scanned and faded (or grayed) text (English). The user can toggle back and forth between the positions of the scanned text and the translated text. In other words, the user can toggle to bring the scanned text in the foreground (on top of the translated text) and push the translated text to the background (or lower layer). The bounding box width of the scanned text is computed to equal the bounding box height of the translated text. The centers of the bounding boxes are computed to overlap.

Figure 3:
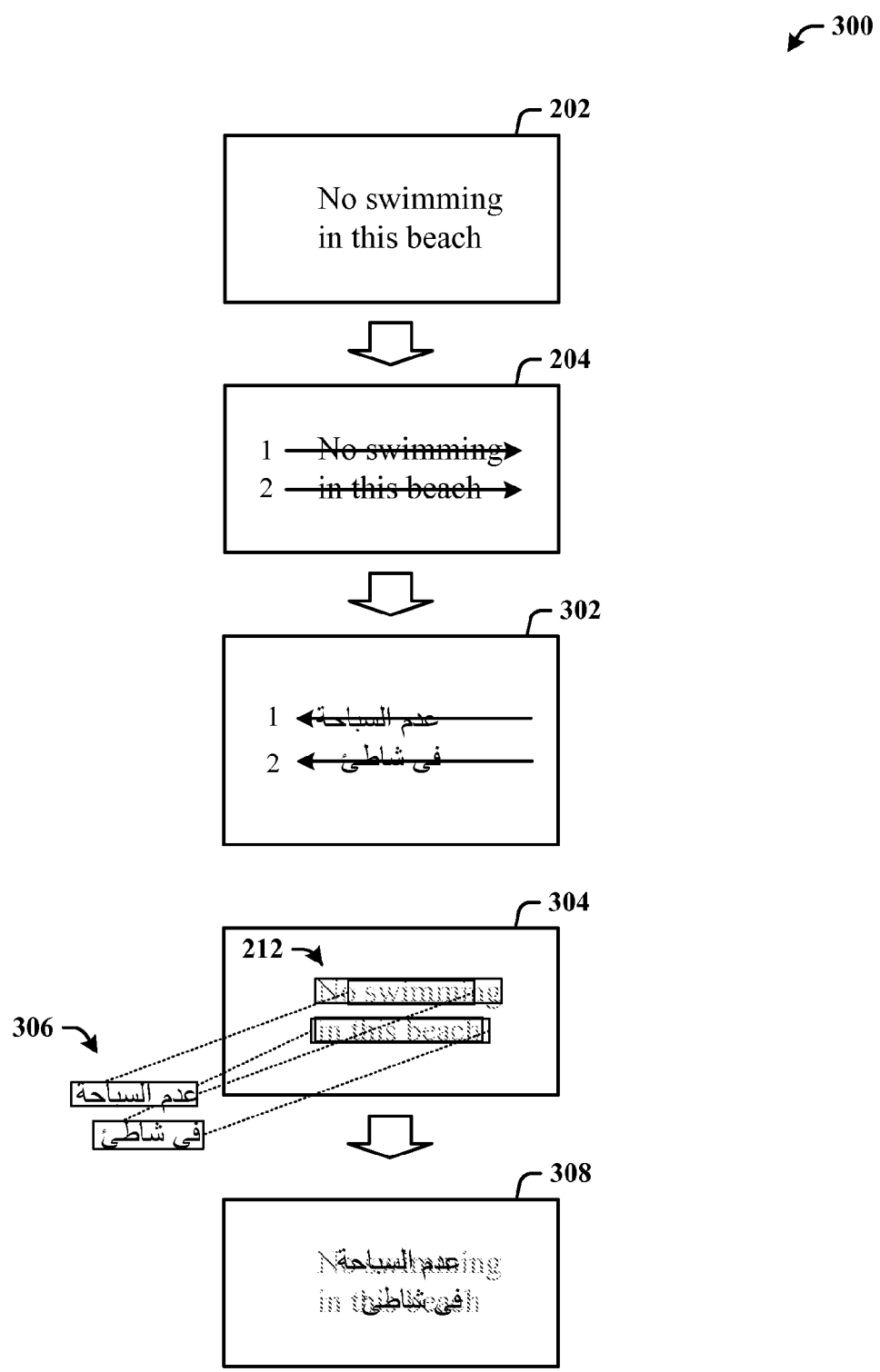
FIG. 3 illustrates an algorithm for overlaying text in cases of translating text from a first language written in first direction to a second language written in the opposite direction.

FIG. 3 illustrates an algorithm 300 for overlaying text in cases of translating text from a first language written in first direction to a second language written in the opposite direction. For example, the overlay algorithm 300 in this case handles English (written left to right) as the scanned text and Arabic as the translated text (written right to left) is being scanned and translated to English (written left to right). In this example, the first panel 202 and the second panel 204 are the same as from FIG. 2, since the scanned English text is "No swimming in the beach".

In a third panel 302, translation (by the translator 108) is the English text into the Arabic equivalent (the "to" language text, or also called the translated text), on two lines like the English version, and written right to left. Similarly, the algorithm detects two lines of text and the arrows indicate the translated text is written right to left and are in the center of the word string for that given line.

In a fourth panel 304, the bounding boxes are derived and applied to both the English text and the Arabic text. There are bounding boxes for the scanned textual portions of "No swimming" and "in this beach", as well as for the translated textual portions. For clarity of this description, the translated text 306 is projected away from the scanned text 212. The bounding box of the top portion of the translated text is overlayed onto the scanned text "No swimming", aligned and overlapped. Similarly, the bounding box of the bottom portion of translated text is overlayed onto the scanned text "in this beach", aligned and overlapped.

When the user scans the image text, the OCR engine outputs the recognized "text and the line bounding boxes. Since the "from" and "to" languages are known at this point (e.g., as both set by user), the directions in which the languages are written are known; thus, the appropriate algorithm can be used. In case of opposite directions, the height of the line bounding boxes of overlayed (translated) text is computed to be the same as for the scanned text (height of line bounding boxes). The centers of the line bounding boxes for scanned and overlayed text are computed to overlap.

In a fifth panel 308, a visual effect is to fade the scanned text (background) so that the translated text can be easily viewed and understood, as presented in a user device display. The user can toggle back and forth between the positions of the scanned text and the translated text. In other words, the user can toggle to bring the scanned text in the foreground (on top of the translated text) and push the translated text to the background (or lower layer). The bounding box width of the scanned text equals the bounding box height of the translated text. The centers of the bounding boxes overlap.

Figure 4:
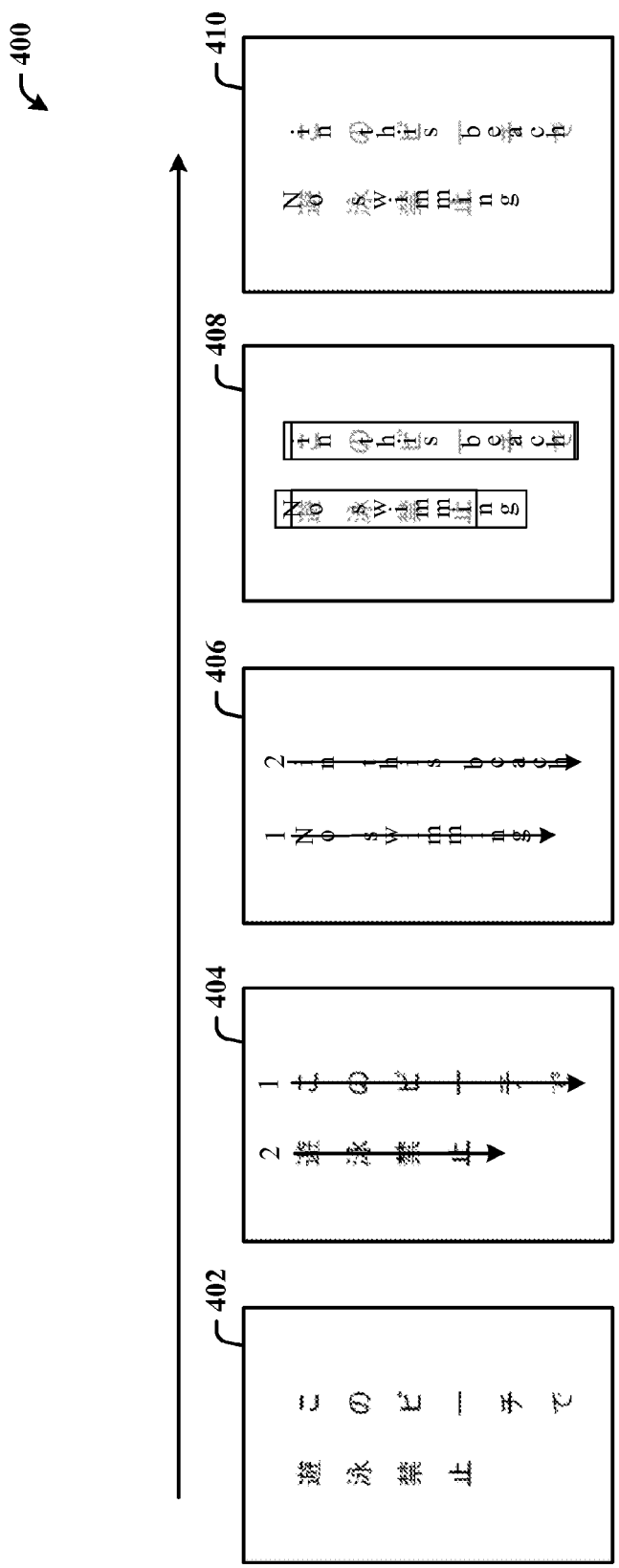
FIG. 4 illustrates an algorithm for overlaying text in cases of translating text from a first language written in first direction to a second language written orthogonal to the first direction.

FIG. 4 illustrates an algorithm 400 for overlaying text in cases of translating text from a first language written in first direction to a second language written orthogonal to the first direction. In this example, the scanned text is in the Japanese language (written top-to-bottom and right-to-left) and the translated text is English (written left-to-right). In a first panel 402, the scanned Japanese text is written vertically as two lines. In a second panel 404, the algorithm 400 finds the line centers and writing direction of top-down and extending right-to-left. In a third panel 406, the algorithm 400 translates the Japanese scanned text into English translated text, orients the translated English into two vertical lines in agreement with the two lines of Japanese text (in contrast to what normally may be a single horizontal line when written in the English grammar sentence structure) and written top-down with an extra line to the right to track reading the English language from left-to-right (the opposite vertical direction of the Japanese text). In a fourth panel 408, the bounding boxes are created and circumscribed about two separate textual instances of each of the scanned text and the translated text.

When the user scans the text (in camera video mode), the OCR engine outputs the recognized text and the line bounding boxes. Since the "from" and "to" languages are known at this point (e.g., as both set by user), the direction in which the languages are written are known; thus, the appropriate algorithm can be used. In case the directions are different, the following rules can apply: if transforming horizontal lines to vertical lines, the bounding box height of the scanned text is computed to be equal to the bounding box width of the translated text. Bounding box centers are computed to overlap. Additionally, when transforming vertical lines to horizontal lines, the bounding box width of the scanned text is computed to be equal to the bounding box height of the translated text. Bounding box centers are computed to overlap.

In a fifth panel 410, a visual effect is to fade the scanned (original) text so that the translated text can be easily viewed and understood, as presented in a user device display. The translated text is presented vertically in front (superimposed on) of the scanned and faded (or grayed) text (English). The user can toggle back and forth between the positions of the scanned text and the translated text. In other words, the user can toggle to bring the scanned text in the foreground (on top of the translated text) and push the translated text to the background (or lower layer), and vice versa to then toggle back to where the translated text on superimposed on to the original text. The bounding box width of the scanned text is computed to equal the bounding box height of the translated text. The centers of the bounding boxes are computed to overlap. It is not necessarily the case here that the translated English text overlaying the original Japanese text is word-for-word correlated to the English text, but line-by-line. That is, two lines of vertically written Japanese text results in two lines of vertically written English translated text, three lines of vertical Japanese text results in three lines of vertical English translated text, etc. Moreover, since the English translated text is normally read from left to right, structuring the English text vertically, reading top-to-bottom in a left-to-right manner is still intuitive and understandable to the viewer, even though there may not be a direct translation equivalency between the underlying and overlying lines of language texts.

In an alternative or combined implementation, it can be made user configurable such that the user can choose to present the translated text in the same direction as the written original text. In this implementation, the result of panel 410 would be to superimpose the left vertical line of English words of "No swimming" over what is the right vertical line of the underlying Japanese text. Accordingly, the right vertical line of English words of "in this beach", in panel 410, is superimposed over what is the left vertical line of the underlying Japanese text. Thus, the viewer then reads the English text in a top-to-bottom and right-to-left manner as the Japanese language is normally read. This may provide some aspect of teaching a user to get familiar with reading text in different ways, such as associated with the Japanese language.

Figure 5:
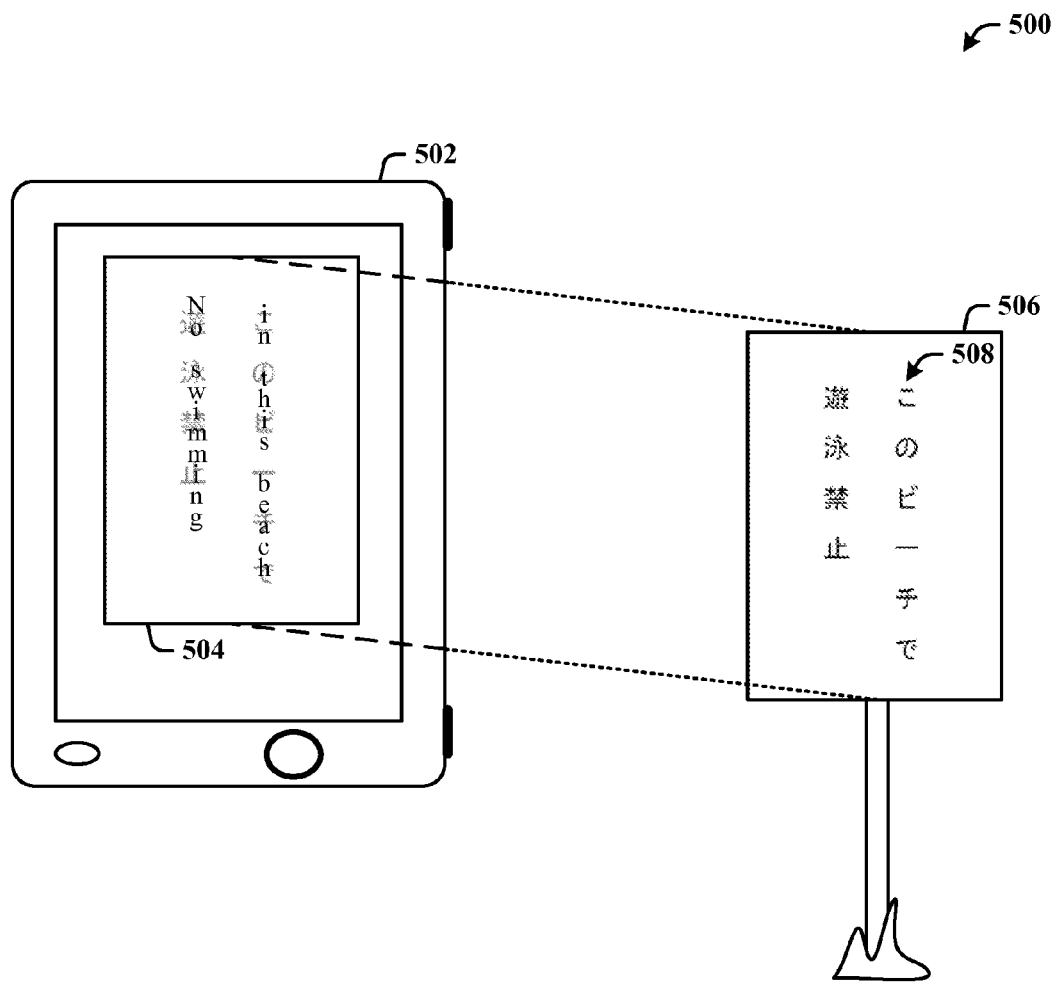
FIG. 5 illustrates a system where a mobile device having a camera system display via which a sign is viewed with vertically written scanned text.

FIG. 5 illustrates a system 500 where a mobile device 502 having a camera system display 504 via which a sign 506 is viewed with vertically written scanned text 508. Here, the scanned text 508 is the Japanese text of the first panel 402 of FIG. 4. The local OCR recognition system and overlay algorithms operate to provide the translated text over the scanned text in realtime. All the user needs to do it to aim (point) the camera at the source of the text (e.g., a menu, the road sign 506, etc.) and the translated text is automatically presented in the display 504 as superimposed on the original Japanese text.

Figure 6:
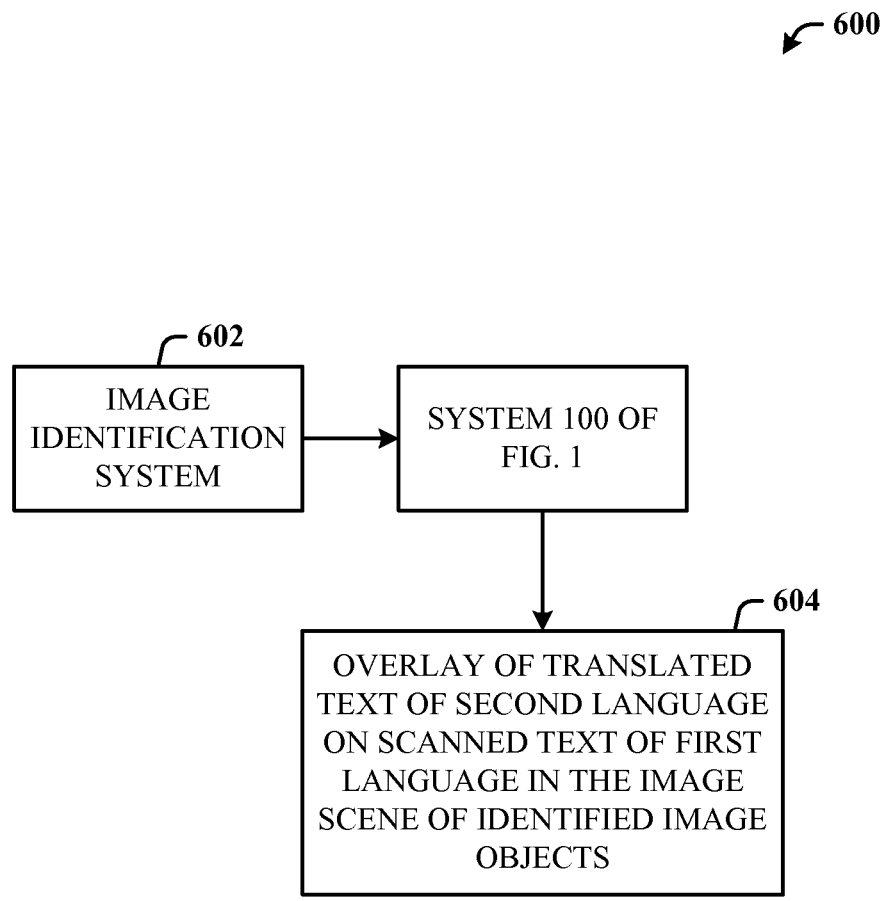
FIG. 6 illustrates an alternative system where the system of FIG. 1 receives the output of an image identification system.

FIG. 6 illustrates an alternative system 600 where the system 100 of FIG. 1 receives the output of an image identification system 602. The image identification system 602 operates to capture an image, and then automatically tags (identifies) and overlays objects in the image scene with the appropriate text in a first language. For example, if the image scene includes a mountain and a cable car system traversing the mountain, the system 602 then operates to annotate the image by superimposing English text of "mountain" on the mountain object of the scene, and "cable car" text on the cable car system object in the image. The annotated image from the system 602 is then input to the system 100 of FIG. 1, where at 604, the translated text is overlayed on the scanned text for the identified objects in the image for quick reference by the user. This can serve as a training tool to learn different languages. Additionally, if the user is traveling in Austria, the user device so configured will readily show the traveler the local language term(s) for the given annotated scene objects.

In another implementation, the user simply aims the device camera at a text document, and the translated text is overlayed on the scanned document text, in realtime. This is similar to the menu example where the user can readily see the translated text.

The disclosed architecture can work in both online and offline modes. The online mode has been described throughout this description where the translation is provided while the user is in the environment and wants a translated result in realtime. The offline mode operates similarly, only that the user can leisurely perform text translation and overlay afterwards such as when reviewing pictures of road signs, menus, etc., taken on a previous trip. The translation overlay occurs in realtime, but essentially from images previously captured.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
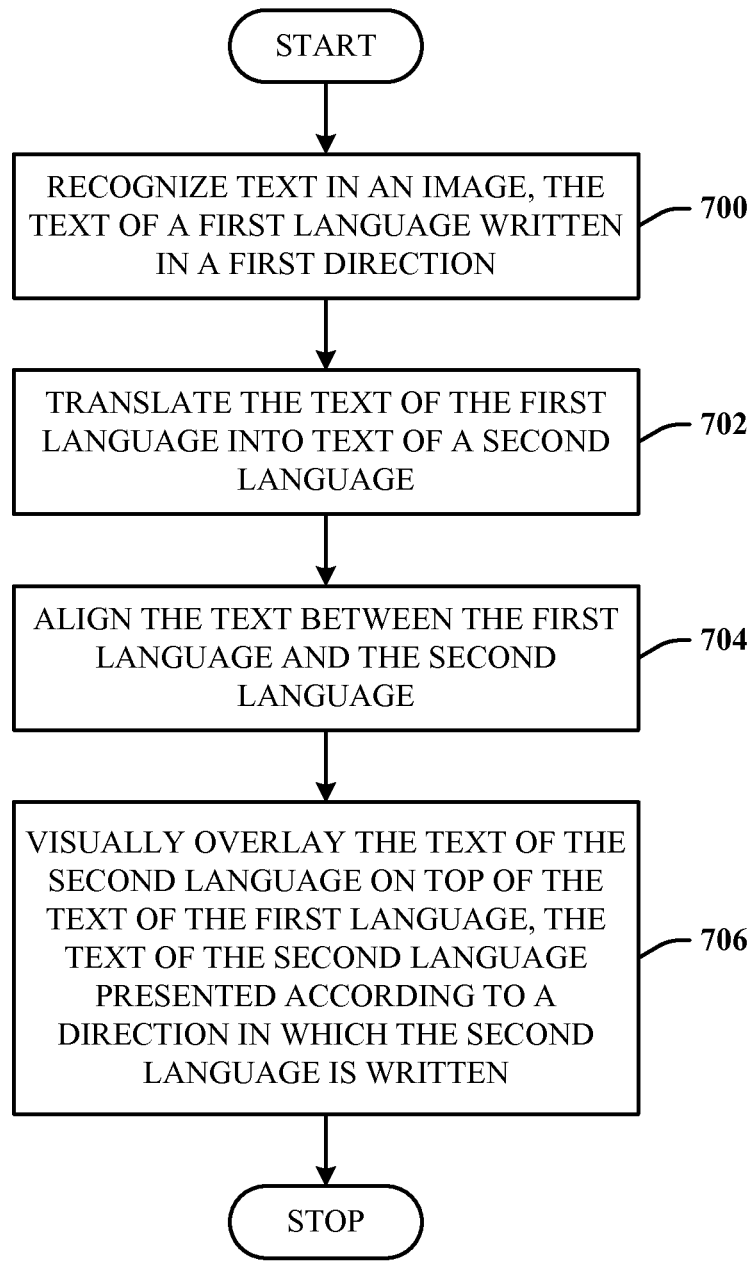
FIG. 7 illustrates a method in accordance with the disclosed architecture.

FIG. 7 illustrates a method in accordance with the disclosed architecture. At 700, text in an image is recognized (OCR). The text of a first language is written in a first direction. At 702, the text of the first language is translated into text of a second language. At 704, the text of the first language and the second language is aligned. At 706, the text of the second language is visually overlayed on top of the text of the first language (thereby partially obscuring parts of the text of the first language). The text of the second language is presented according to a direction in which the second language is written.

The method can further comprise creating a first bounding box that circumscribes the text of the first language and a second bounding box that circumscribes the text of the second language, and aligning the second bounding box to the first bounding box as part of overlaying the text of the second language on the text of the first language. The method can further comprise obtaining orientation information associated with the text in the image. The method can further comprise overlaying the text of the second language on the text of the first language in a line-by-line or word-to-word relationship.

The method can further comprise overlaying the text of the second language on the text of the first language in a direction opposite from which the first language is written. The method can further comprise overlaying the text of the second language on the text of the first language in a same direction as the first language is written. The method can further comprise overlaying the text of the second language on the text of the first language in a direction orthogonal to the direction in which the first language is normally written. The method can further comprise performing the acts of recognizing, translating, aligning, and visually overlaying, in realtime during a video mode of a camera.

Figure 8:
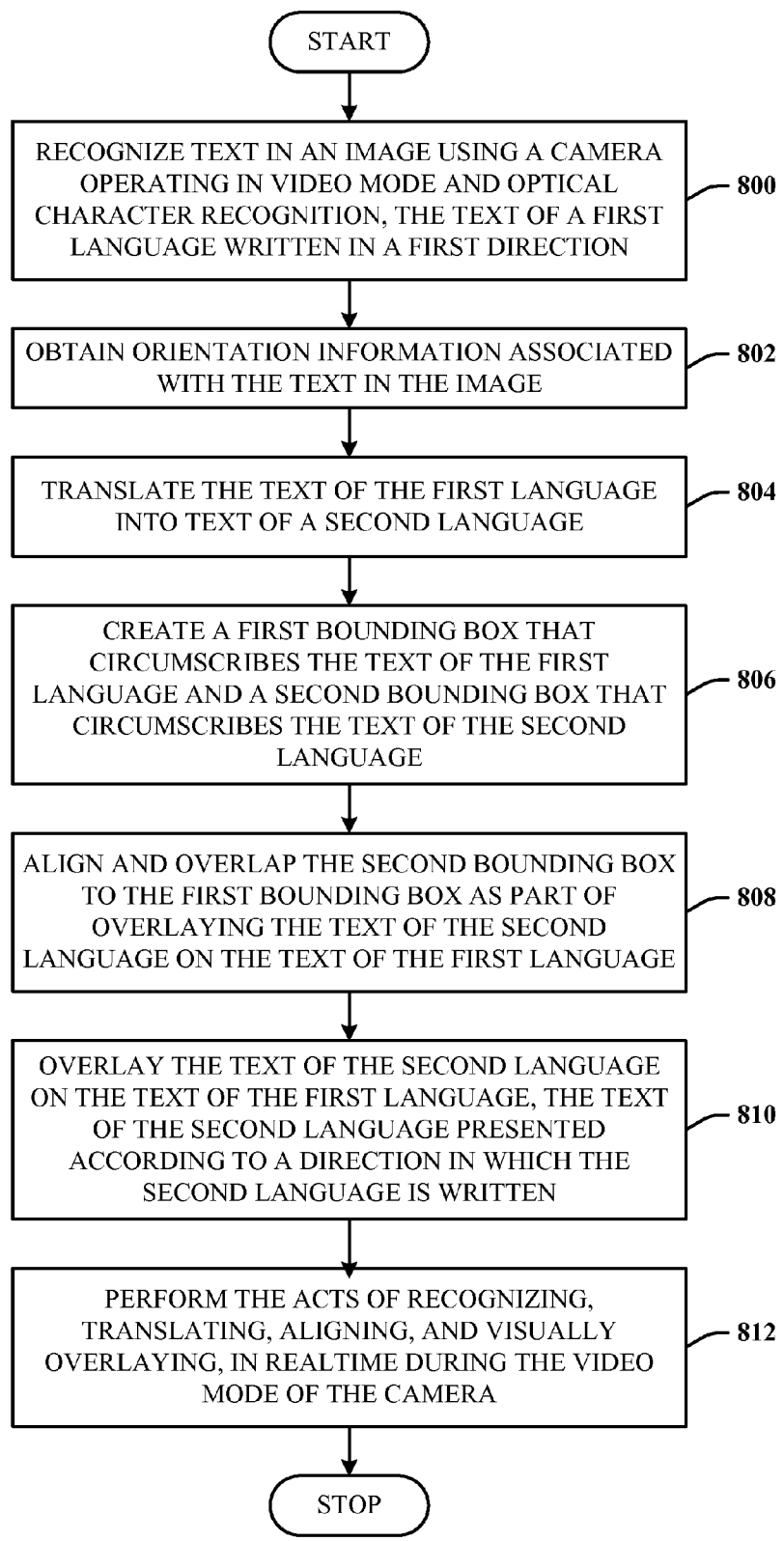
FIG. 8 illustrates an alternative method in accordance with the disclosed architecture.

FIG. 8 illustrates an alternative method in accordance with the disclosed architecture. At 800, text in an image is recognized using a camera operating in video mode and optical character recognition. The text is of a first language written in a first direction. At 802, orientation information associated with the text in the image is obtained. At 804, the text of the first language is translated into text of a second language. At 806, a first bounding box is created that circumscribes the text of the first language and a second bounding box is created that circumscribes the text of the second language. At 808, the second bounding box is aligned and overlaps to the first bounding box as part of overlaying the text of the second language on the text of the first language. At 810, the text of the second language is overlayed on the text of the first language. The text of the second language is presented according to a direction in which the second language is written. At 812, the acts of recognizing, translating, aligning, and visually overlaying, are performed in realtime during the video mode of the camera.

The method can further comprise overlaying the text of the second language on the text of the first language in a line-by-line relationship (e.g., three lines of original text results in three lines of translated text). The method can further comprise overlaying the text of the second language on the text of the first language in a direction opposite from which the first language is written. The method can further comprise overlaying the text of the second language on the text of the first language in a same direction (e.g., vertically and/or horizontally) as the first language is written. The method can further comprise overlaying the text of the second language on the text of the first language in a direction orthogonal to the direction in which the first language is normally written.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
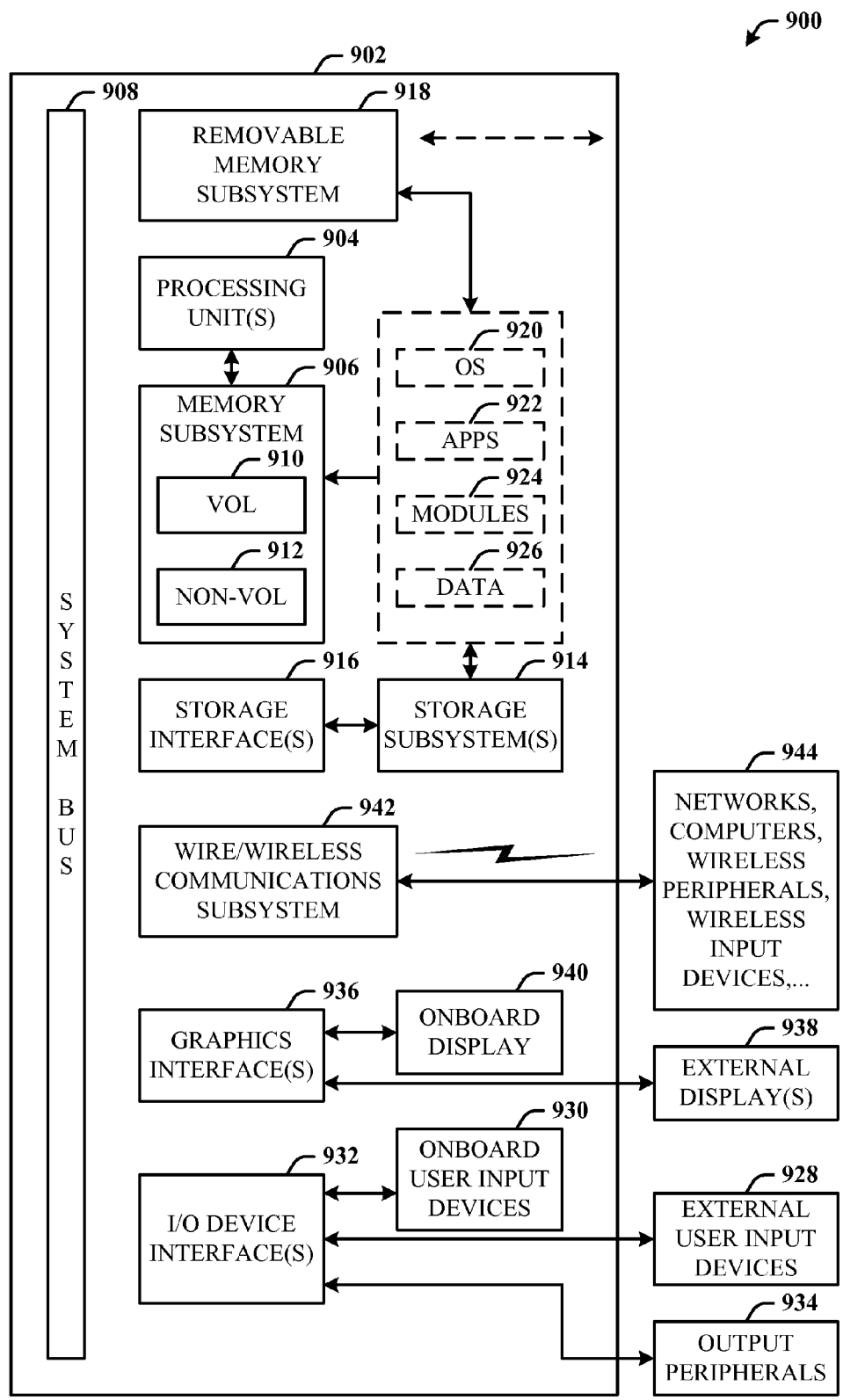
FIG. 9 illustrates a block diagram of a computing system that executes text overlay for realtime translations in accordance with the disclosed architecture.

Referring now to FIG. 9, there is illustrated a block diagram of a computing system 900 that executes text overlay for realtime translations in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904 (also referred to as microprocessor(s) and processor(s)), a computer-readable storage medium such as a system memory 906 (computer readable storage medium/media also include magnetic disks, optical disks, solid state drives, external memory systems, and flash memory drives), and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include entities and components of the system 100 of FIG. 1, entities and flow of the algorithm 200 of FIG. 2, entities and flow of the algorithm 300 of FIG. 3, entities and flow of the algorithm 400 of FIG. 4, entities and components of the system 500 of FIG. 5, entities and components of the system 600 of FIG. 6, and the methods represented by the flowcharts of FIGS. 7 and 8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media (medium) can be any available media (medium) that do (does) not employ propagated signals, can be accessed by the computer 902, and includes volatile and non-volatile internal and/or external media that is removable or non-removable. For the computer 902, the media accommodate the storage of data in any suitable digital format. It should be appreciated by those skilled in the art that other types of computer readable medium can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example.

These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a recognition system configured to recognize text in an image, the text of a first language written in a first direction;
    a translator configured to translate the text of the first language into text of a second language;
    an overlay algorithm configured to determine orientation and alignment between the text of the first language and the text of the second language, and overlays the text of the second language on the text of the first language as viewed in a display, such that each translated word corresponds to respective original text words;
    wherein the recognition system, the translator, and the overlay algorithm are configured to overlay the text of the second language on top of the text of the first language in realtime for viewing with graphical emphasis applied to differentiate the overlaid languages to the viewer; and a microprocessor configured to execute computer-executable instructions in a memory, the instructions executed to enable the recognition system, the translator, and the overlay algorithm.

2. The system of claim 1, wherein the recognition system, the translator, and the overlay algorithm operate to overlay the text of the second language on the text of the first language in the display in realtime using a video mode.

3. The system of claim 1, wherein the recognition system creates a first bounding box that circumscribes the text of the first language and a second bounding box that circumscribes the text of the second language, and the overlay algorithm aligns the second bounding box to the first bounding box as part of overlaying the text of the second language on the text of the first language.

4. The system of claim 3, wherein the overlay algorithm aligns the first and second bounding boxes to each other based on bounding box centers.

5. The system of claim 1, wherein the overlay algorithm computes a relationship of textual portions of the second language to related textual portions of the first language and overlays the related textual portions.

6. The system of claim 1, wherein the overlay algorithm obtains orientation information associated with the text of the first language in the image, the orientation information relates to writing vertically or horizontally.

7. The system of claim 1, wherein the overlay algorithm overlays the text of the second language on the text of the first language in a direction opposite from which the first language is written or in a same direction as the first language is written.

8. The system of claim 1, wherein the overlay algorithm overlays the text of the second language on the text of the first language in a direction orthogonal to the direction in which the first language is normally written and new lines are added.

9. A method, comprising acts of:
recognizing text in an image, the text of a first language written in a first direction;
translating the text of the first language into text of a second language;
aligning the text between the first language and the second language;
visually overlaying the text of the second language on top of the text of the first language, the text of the second language is selectively presented vertically or horizontally according to a direction in which the second language is written; and
configuring a processor to execute instructions related to at least one of the acts of recognizing, translating, aligning, or visually overlaying.

10. The method of claim 9, further comprising:
creating a first bounding box that circumscribes the text of the first language and a second bounding box that circumscribes the text of the second language; and
aligning the second bounding box to the first bounding box as part of overlaying the text of the second language on the text of the first language.

11. The method of claim 9, further comprising obtaining orientation information associated with the text in the image.

12. The method of claim 9, further comprising overlaying the text of the second language on the text of the first language in a line-by-line or word-to-word relationship.

13. The method of claim 9, further comprising overlaying the text of the second language on the text of the first language in a direction opposite from which the first language is written.

14. The method of claim 9, further comprising overlaying the text of the second language on the text of the first language in a same direction as the first language is written.

15. The method of claim 9, further comprising overlaying the text of the second language on the text of the first language in a direction orthogonal to the direction in which the first language is normally written.

16. The method of claim 9, further comprising performing the acts of recognizing, translating, aligning, and visually overlaying, in realtime during a video mode of a camera.

17. A method, comprising acts of:
recognizing text in an image using a camera operating in video mode and optical character recognition, the text of a first language written in a first direction;
creating a first bounding box that circumscribes the text of the first language and a second bounding box that circumscribes text of a second language;
obtaining orientation information associated with the text in the image;
translating the text of the first language into the text of the second language;
aligning and overlapping the second bounding box to the first bounding box as part of overlaying the text of the second language on the text of the first language;
overlaying the text of the second language on the text of the first language, the text of the second language presented according to a direction in which the second language is written;
performing the acts of recognizing, translating, aligning, and visually overlaying, in realtime during the video mode of the camera; and
configuring a processor to execute instructions related to at least one of the acts of recognizing, creating, obtaining, translating, aligning, overlaying, or performing.

18. The method of claim 17, further comprising overlaying the text of the second language on the text of the first language in a line-by-line relationship.

19. The method of claim 17, further comprising overlaying the text of the second language on the text of the first language in a direction opposite from which the first language is written or in a same direction as the first language is written.

20. The method of claim 17, further comprising overlaying the text of the second language on the text of the first language in a direction orthogonal to the direction in which the first language is normally written.

* * * * *